June 19, 1956 E. F. SMALL 2,751,165
FISHING REEL
Filed Dec. 10, 1953
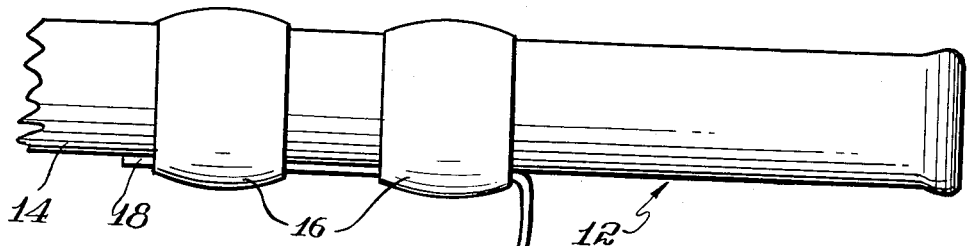
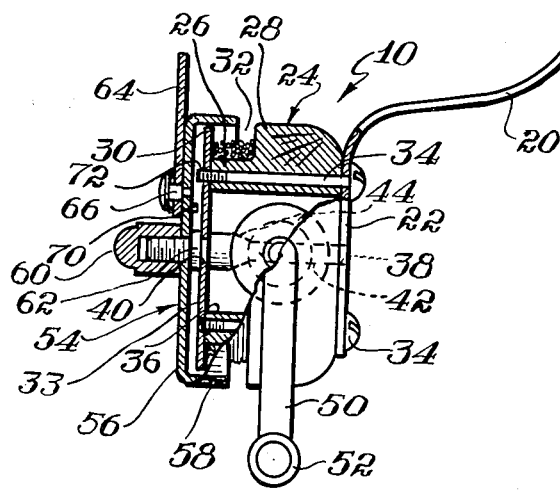
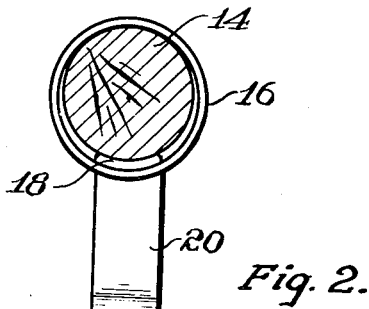
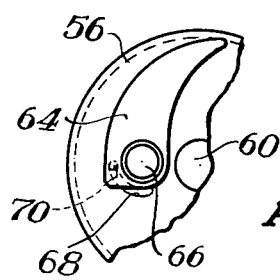
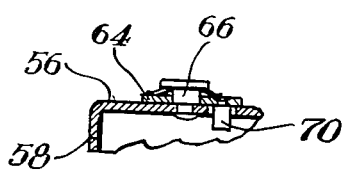
Inventor
Edward F. Small
by Roberts, Cushman & Grover
Att'ys.

United States Patent Office 2,751,165
Patented June 19, 1956

2,751,165

FISHING REEL

Edward F. Small, Newton, Mass.

Application December 10, 1953, Serial No. 397,289

7 Claims. (Cl. 242—84.1)

This invention relates to fishing reels and more especially to spinning reels having a fixed spool.

The principal object of the invention is to provide a fixed spool reel of improved construction wherein the line follows a smooth path as it leaves the spool to the rod eyes with no intervening sharp changes in direction or contact with parts of the rewinding mechanism in such manner as to retard its free running. A further object is to provide a reel in which the unwinding line will leave the package in such a direction as not to drag or entrain adjacent loops from the package thereby minimizing snarling. Another object is to provide a reel in which change over from pay-off position to take-up position may be made with a flick of the finger in which during take-up the line will be wound on the spool in a direction to impart a minimum amount of twist thereto. Still further objects are to provide a reel of very simple compact construction embodying a minimum number of parts so as to be inexpensive to manufacture and yet is durable and highly satisfactory in operation.

As herein illustrated the reel comprises a fixed spool having a peripheral groove for receiving or paying off a line, which is adapted to be supported on a rod with its axis spaced from and parallel to the axis of the rod. A winding bell is mounted at the forward end of the spool, on a shaft journaled in the spool, for rotation about the axis of the spool and has a radially extending wall perpendicular to the axis of the spool and a flange at its perimeter parallel to the axis of the spool. The flange is concentric with the groove and partly overlies the same. There is means for effecting rotation of the shaft on which the bell is mounted in the form of a crank journaled in the wall of the spool and meshing gears fast to the shaft and crank respectively. A pick-up finger for engaging the line during rewinding is carried by the bell and is bodily movable therewith about the axis of the spool in a plane perpendicular thereto. The pick-up finger is pivotally fastened to the radial wall of the bell at a point radially spaced from the axis of rotation and is movable therebout from a position within the peripheral edge of the bell to a position extending outwardly therefrom. A spur fast to the finger extends rearwardly therefrom toward the face of the spool and is operably engaged with a forwardly projecting spur on the spool when the bell is rotated to swing the finger from its inoperative position to its outwardly extending position.

The invention will now be described in greater detail with reference to the accompanying drawing wherein:

Fig. 1 is a side elevation of the reel shown fastened to the handle portion of the fishing rod, and partly in section in a vertical diametrical plane longitudinally thereof;

Fig. 2 is a front elevation of the reel partly in section in a vertical plane transversely thereof;

Fig. 3 is a fragmentary section of the front part of the reel showing the take-up finger in its inoperative position; and Fig. 4 is a fragmentary section taken on the line 4—4 of Fig. 2.

Referring to the figures, the reel 10 is shown fastened to the handle grip 12 of a fishing rod 14 by conventional slide rings 16 of which there are two shown herein. The reel is fastened to the rod by a bracket consisting of a flat metal strap having a straight length 18 transversely concave so as to conform to the curvature of the rod, a downwardly curved portion 20 spacing the reel on the underside of the rod, and a flat vertical portion 22 forming a support for and constituting part of the reel. The reel consists of a spool block 24 having a barrel 26 and spaced parallel flanges 28 and 30 which constitute the walls of and define a peripheral groove 32 for receiving the line. The groove is formed by reducing the diameter of the block near one end and fastening a flat rigid plate 33 thereto which corresponds substantially in diameter to the unreduced portion of the block. The block and plate are fastened together and to the bracket portion 22 by screws 34 which pass through the bracket, through the block and are threaded into the rigid plate 33. The spool block is shown as being made of wood, however, it is to be understood that other materials such as plastic or metal may be employed if consistent with durability and economy of manufacture.

The spool block has a hole 36 axially through it of relatively large diameter, the opposite ends of which are covered by the plates 22 and 33 which in turn have holes 38 and 40 therethrough aligned with each other and on center with the axis of the spool. A shaft 42 is journaled in the holes 38 and 40 in the plates for rotation about a horizontal axis coinciding with the axis of the spool and has fast to it within the block a pinion gear 44. Rotation of the shaft is effected by a ring gear 46, which meshes with the pinion gear 44, fastened to the inner end of a shaft 48 extending through the wall of the spool substantially at right angles to the axis of the shaft 42. The outer end of the shaft has a crank arm 50 and handle 52 to facilitate rotation thereof. The forward end of the shaft 42 extends through the plate 33 and has fast to it a winding bell 54 which has a radial wall 56 lying in a plane perpendicular to the axis of the shaft and a peripheral flange 58 at right angles thereto which extends rearwardly part way across the open mouth of the groove and is concentric with the bottom thereof. Preferably, the inner edge of the flange lies about midway between the walls of the groove. The shaft 42 is threaded at its outer extremity for receiving a nut 60 for clamping the winding bell against an annular shoulder 62 on the shaft so that the winding bell will turn with the shaft when the latter is rotated. Endwise movement of the shaft is prevented by engagement of the shoulder 40 with one side of the plate 33 and the hub of the pinion gear 44 with the opposite side.

A take-up finger 64 is mounted on the radial face or wall 56 of the winding bell for rotation therewith in a plane perpendicular to the axis of rotation of the shaft 42. The finger 64 is mounted on a stud 66 fast to the face of the winding bell at a point radially distant from the axis of rotation thereof and is pivotally movable thereon from an inoperative position in which it is confined within the periphery of the winding bell as shown in Fig. 3, to an operative position extending outwardly therefrom as shown in Fig. 2. Behind the finger 64 there is an arcuate slot 68 through the radial face of the winding bell and the finger has on it a pin 70 which extends rearwardly therefrom through this arcuate slot. When the finger is in the position shown in Fig. 3, that is, its inoperative position, the pin occupies the outer end of the slot 68 at a predetermined radial distance from the center of rotation of the bell which corresponds to the radial distance of one of the bolts 34 from the same center. The end of the bolt is extended inwardly beyond the forward end of the spool forming a projection or spur 72 which lies in the path of movement of the pin 70, hence when the winding bell is rotated the pin 70 will strike the spur 72 and the latter will swing the finger outwardly from the position shown in Fig. 3, to that shown in Fig. 2, where it occupies its operative position. During rotation of the bell the finger will stay in its outwardly extending position picking up and guiding the line as it is taken up into the groove 32. When winding is completed a mere flick of the finger restores the finger 64 to its inoperative position and the reel will be again ready for casting. By employing a finger which is mounted on and movable with the winding bell, it is possible to extend the pickup portion much further beyond the periphery of the bell than in conventionally constructed reels and hence to insure pick-up promptly. Moreover, by reason of the opportunity of making the finger longer the latter may be shaped along one edge by making it concave to retain the line once it is picked up so that it will not be apt to slip off at an inauspicious moment.

In use the act of casting draws the line from groove 32 at such a rapid rate that it billows outwardly substantially at right angles to the axis of the spool. The billowing of the line lifts the coils radially from the underlying package and thus minimizes the chance for adjacent loops to become entrained and pulled off the reel prematurely. The inner edge of the flange of the winding bell assists unwinding by constraining the line as it leaves the spool to substantially vertical movement relative to the axis of rotation until it clears the package preventing axial movement thereof prior to clearing the package which might pull subjacent loops therewith. By reason of the free running from the groove and absence of surfaces or guiding eyes which reverse or sharply change the path the line follows between the point where it leaves the spool to the first eye on the rod, it is clear that the line is subjected to the minimum amount of frictional drag and hence that maximum casting distances may be attained. No drag or brake is required for the spool is non-rotatably fixed to the bracket plate 22 and hence remains stationary during payoff. The winding bell will also ordinarily remain stationary by reason of the frictional resistance of the gears to rotation, however, even if there is some rotation of the winding bell such rotation is not harmful since the pickup finger is in an out-of-the-way position so that the line is free to run over the flange without interference. To effect take-up of the line, the handle 52 is rotated which brings the nub 70 on the finger 64 into contact with the nub 72, thus throwing the finger outwardly so that it picks up the line and carries it around in coils, winding it up on the spool. At the end of winding the finger 64 is flicked back into its inoperative position and the reel is ready for casting.

The important aspects of the reel construction are the provision of an open end reel having an axis spaced from and parallel to the axis of the rod so that the line wound thereon can pass freely over its forward end without interference from any part of the winding mechanism and yet has an unusually large pick-up finger which insures prompt engagement of the line at the first turn of the winding reel and prevents any chance for the line to slip off during winding. Additional advantageous features are the simplicity of construction and small number of parts which make it easy to manufacture at a low cost without sacrifice in quality or durability.

It should be understood that the present disclosure is for the purpose of illustration only and that this invention includes all modifications and equivalents which fall within the scope of the appended claims.

I claim:

1. A fishing reel comprising a spool having a peripheral groove for receiving or paying off a line, means for non-rotatably supporting the spool on a rod with an end of the spool facing in the direction of the tip of the rod and with its axis spaced from and parallel to the axis of the rod, a winding bell mounted on the spool for rotation about the axis thereof, said bell having a peripheral flange radially spaced from the bottom of the groove and only partially covering the groove, the remainder of the groove being open radially so that the line is radially unconstrained as it is paid off or taken up, means for effecting rotation of the bell, a pick-up finger carried by the bell for rotation about the axis of the spool, means pivotally supporting the finger on the bell for rotation about an axis spaced from and parallel to the axis of the spool, said finger being movable from a position lying within the periphery of the bell to a position extending outwardly from the periphery thereof, and means carried by the spool interengageable with a part of the finger by rotation of the bell to move the finger to said extended position.

2. A fishing reel comprising a spool having a peripheral groove for receiving or paying off a line, means for non-rotatably supporting the spool on a rod with an end of the spool facing in the direction of the tip of the rod with its axis spaced from and parallel to the axis of the rod, a winding bell mounted on the spool for rotation about the axis thereof, said bell having a peripheral flange radially spaced from the bottom of the groove and only partially covering the groove, the remainder of the groove being open radially so that the line is radially unconstrained as it is paid off or taken up, means for effecting rotation of the bell, a pick-up finger carried by the exposed forward face of the bell for rotation about the axis of the spool in a plane perpendicular thereto, a stud fast to the bell spaced from and parallel to the axis thereof on which the finger is pivotally mounted for movement in said perpendicular plane from a position in which it lies within the periphery of the bell to a position in which it extends outwardly therefrom, a nub fast to the finger at a point radially spaced from its center of rotation and extending rearwardly therefrom through the bell, a nub projecting forwardly from the adjacent end of the spool, said rearwardly and forwardly extending nubs being interengageably operable by rotation of the bell to swing the finger from a position within the periphery of the bell to a position extending outwardly therefrom.

3. A fishing reel comprising a spool having a peripheral groove for receiving or paying off a line, an attaching bracket for making the spool non-rotatably fast to a rod with its ends facing forwardly and rearwardly with respect to the axis of the rod and its axis spaced from and parallel thereto, a bell shaft journaled in the ends of the spool at its axis having a portion projecting from the forward end of the spool, a bell fastened to the forwardly extending portion of the shaft having a radially extending wall perpendicular to the axis of the shaft and a flange at its periphery parallel to the axis of the shaft, said flange extending rearwardly therefrom partly over the mouth of the forward face of the groove leaving the rest of the groove radially open, a stud fixed to the radially extending wall of the bell at a point spaced from the axis of the spool shaft, a finger rotatably mounted on the stud for movement thereon in the plane of the radial wall from a position within the periphery of the bell to a position extending outwardly therefrom, a spur carried by the finger and extending rearwardly therefrom through the radial wall toward the rearward end of the spool, said spur describing a circle of predetermined diameter when the finger is confined within the perriphery of the bell, a fixed spur at the forward end of the spool, located at a radial distance from the center of rotation thereof, corresponding to the radius of said prescribed circle of rotation of the spur on the finger, engageable with the spur on the finger by rotation of the bell, to swing the latter to a position extending outwardly from the periphery thereof, a gear on the bell shaft, a drive shaft journaled in the wall of the spool with its axis intersecting the axis of the spool, a gear on the drive shaft in mesh with the gear on the bell shaft and a handle on the drive shaft exteriorly of the spool for effecting rotation of the bell shaft.

4. In a fishing reel a spool having spaced flanges defining a groove concentric with the axis thereof, said spool having an axial hole through it, plates covering the ends of the hole through the spool, one of which constitutes part of a supporting bracket and the other a part of one of the flanges, said spool and plates being fastened together with screws which pass through the bracket plate and spool and are threaded into the flange plate, said plates having openings therein coinciding with the axis of the spool, a bell shaft journaled in the openings in the plates with an end projecting from the flange plate, a winding bell fast to the driven shaft exteriorly of the flange plate, having a flange at its perimeter overlying a part of the groove the remainder of said groove being radially open, a finger pivotally mounted on the exposed forward face of the bell at a point removed from its center for bodily movement with the bell about the axis of the bell shaft and pivotal movement about its pivot point in a plane perpendicular to the axis of the bell shaft, from a position confined within the perimeter thereof to a position extending beyond the perimeter, means operable by rotation of the bell to throw the finger to its outwardly extending position, a gear fast to the bell shaft within the spool, a drive shaft journaled in the wall of the spool with an inner end extending into the hole therein, a gear fast to the inner end of the drive shaft and in mesh with the first-named gear, and a crank handle fast to the outer end of the drive shaft.

5. A fishing reel according to claim 1, wherein the finger has a radial length from its pivot to its distal end exceeding the radius of the bell, tapers toward its distal end, has a concave edge for engagement with the line during winding and lies substantially in the plane of the forward face of the bell.

6. A fishing reel according to claim 1, wherein the pick-up finger has an overall length exceeding the radius of the bell, tapers toward its outer extremity, is curved in the direction of rotation of the winding bell and in its outwardly extending position approximately half of its length extends beyond the periphery of the bell.

7. A fishing reel according to claim 1, wherein the spool is hollow, having a cylindrical wall; and the means for effecting rotation of the bell in a bell shaft journaled in the ends of the spool, within the hollow portion thereof, to which the bell is made fast, a crank journaled in the wall of the spool with an end of it extending inwardly into the hollow part thereof and meshing gears fast respectively to the inner end of the crank and to the bell shaft.

References Cited in the file of this patent

UNITED STATES PATENTS

| | | |
|---|---|---|
| 2,492,587 | Ledingham | Dec. 27, 1949 |
| 2,507,457 | Rix | May 9, 1950 |
| 2,521,543 | Shakespeare et al. | Sept. 5, 1940 |
| 2,551,320 | Ferguson | May 1, 1951 |
| 2,597,318 | Haase | May 20, 1952 |
| 2,613,468 | Hand | Oct. 14, 1952 |
| 2,644,648 | Geraci | July 7, 1953 |
| 2,649,258 | Shelburne | Aug. 18, 1953 |
| 2,670,908 | Hill | Mar. 2, 1954 |
| 2,707,597 | Rotsler | May 3, 1955 |

FOREIGN PATENTS

| | | |
|---|---|---|
| 908,659 | France | Oct. 11, 1945 |
| 938,912 | France | Apr. 12, 1948 |